Jan. 31, 1967 E. S. ROSETT 3,302,010

ALGEBRAIC COMPUTATIONAL SUBTRACTION DEVICE

Filed April 23, 1963

INVENTOR.
Edward S. Rosett,
BY H. H. Hulse
Attorney.

3,302,010
ALGEBRAIC COMPUTATIONAL SUBTRACTION DEVICE

Edward S. Rosett, Stamford, Conn., assignor to General Time Corporation, New York, N.Y., a corporation of Delaware Filed Apr. 23, 1963, Ser. No. 275,040
9 Claims. (Cl. 235—177)

Figures 1, 2:
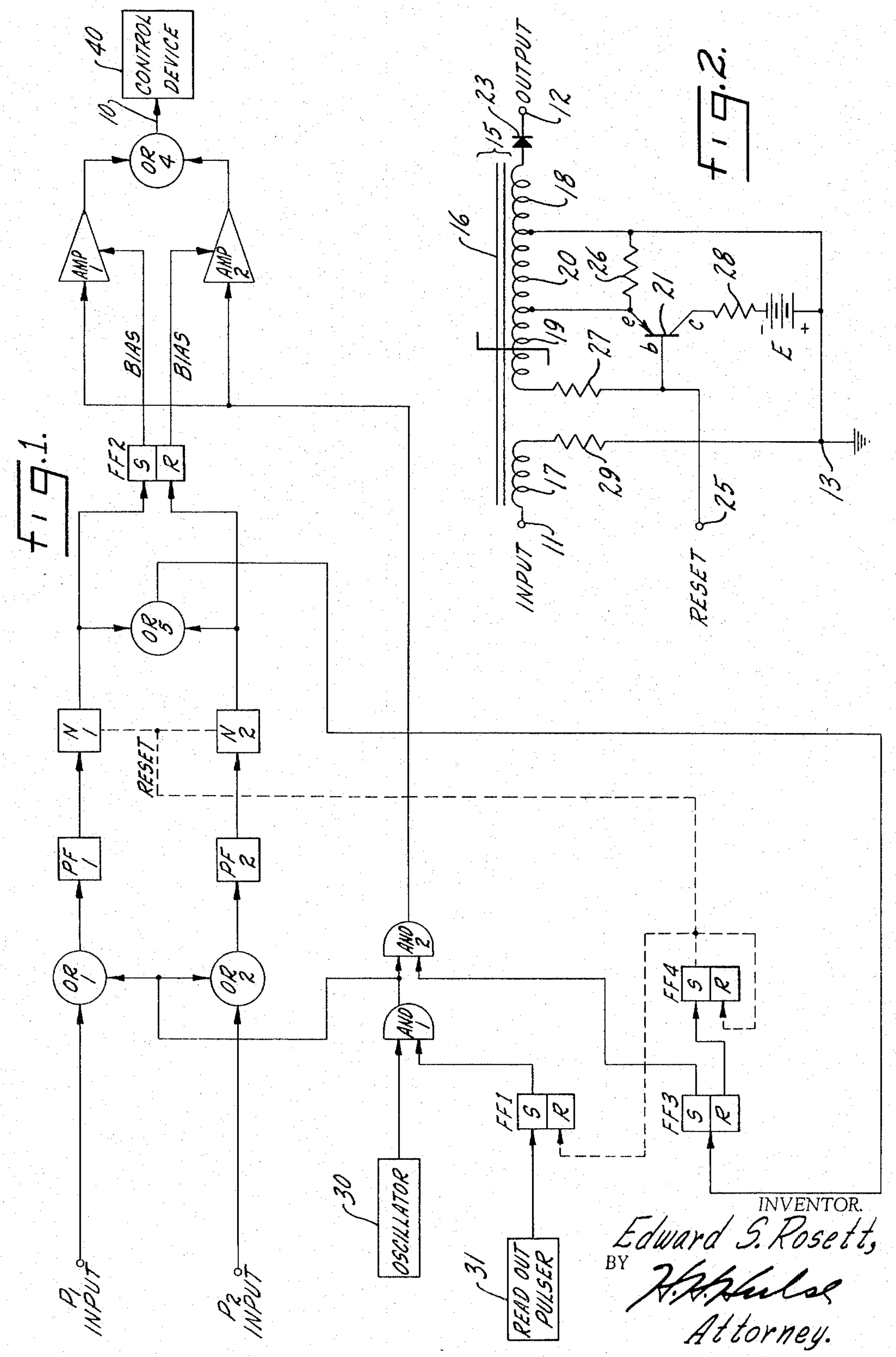

The present invention relates to the field of electronic computation and control and more specifically to a circuit for affecting algebraic subtraction between the counts in a pair of magnetic counters.

An object of this invention is to provide an algebraic computational subtraction device for independently counting in a pair of counters the number of pulses provided by a pair of independent sources and for providing an output representative of the differential counts at the completion of a counting operation. In this connection, an object of this invention is to provide a circuit of this type for producing an output representative of the differential count wherein an indication as to which counter has the greatest count is provided. Further, in this connection an object of this invention is to provide a circuit of this type for affecting algebraic subtraction between the counts in a pair of counters without destroying the differential count therebetween.

Another object of the present invention is to provide an algebraic computational subtraction device which is flexible in application and operation and which is capable of operating substantially independent of the shape, duration or spacing of the input pulses. Thus, the device may be used to respond to pulses which are widely and irregularly spaced or to respond to regularly spaced pulses at high repetitive rates, i.e., operable over a wide speed range.

A further object of the present invention is to provide an algebraic computational subtraction device which is simple and compact, and which decreases power supply requirements both by minimizing the effect of supply voltage variations and by avoiding the consumption of standby power. Thus, the device is well suited for utilization in apparatus wherein power is at a premium, such as missile, satellite, and space probe operations.

A more specific object of the present invention is to provide an algebraic computational subtraction device which makes novel use of magnetic counters of the type employing saturable reactors advanced from negative to positive saturation in accordance with the cumulative energy content of pulses applied thereto.

A general object of this invention is to provide a simple, compact, long life, and economical algebraic computational subtraction device.

Other objects and advantages of this invention will become apparent upon reading the following detailed description and upon reference to the drawings, in which:

FIGURE 1 is a block diagram of an algebraic Incremag constructed in accordance with the present invention; and FIG. 2 is a schematic diagram of a magnetic counter utilized in the algebraic Incremag of FIG. 1.

While the invention has been described in connection with a certain preferred embodiment, it is to be understood that the invention is not to be limited to the disclosed embodiment but, on the contrary, the invention is intended to cover the various modifications and equivalent arrangements, included within the spirit and scope of the appended claims.

In the drawings, flip-flops, AND gates and OR gates have been symbolically illustrated. Since these elements are commonly utilized in the electronic art, the details thereof are not set forth. However, a brief description of the operation of these elements may be helpful in understanding the operation of the algebraic computational subtraction device.

The flip-flops are illustrated as rectangles having two sections, one being marked S and the other being marked R. Inputs to the flip-flops are connected to the left-hand sides thereof and outputs are connected to the right-hand sides thereof. When an input signal or pulse is applied to the S section of a flip-flop, the flip-flop is set and a desired output signal is provided at the S output terminal only. When an input signal or pulse is applied to the R section of a flip-flop, the flip-flop is reset and a desired output signal is provided at the R output terminal only. When an input signal is applied to an input connected to the junction of the S and R sections of a flip-flop, the flip-flop is set in response to a first input signal or pulse and is reset in response to the next succeeding input signal or pulse, the switching action being continuous as input pulses are continuously applied thereto.

The AND gates have a control input terminal, an input terminal and an output terminal and are so designed that an output is provided at the output terminal when input signals are applied to the input terminal and the control terminal, i.e. the gate is opened or rendered conductive. The OR gates have input terminals and output terminals and are so designed that an output is provided at the output terminal when an input is applied to at least one input terminal.

Referring now to the drawings and more specifically to FIG. 1, an algebraic computational subtraction device is illustrated, having a pair of inputs P1 and P2 and an output conductor 10, which is constructed in accordance with the present invention. The device includes only solid-state elements and provides a train of pulses equal in number to the differential count in a pair of counters associated with a pair of inputs whereat input pulses are received. More specifically, a device including only solid-state elements is provided for providing a train of output pulses equal in number to the differential count in a pair of counters, characterized in that the output pulses have a polarity indicative of the counter having the greatest count therein. The algebraic computational subtraction device includes a pair of counters for independently counting pulses provided by a pair of sources, means for providing a train of output pulses equal in number to the differential count in the counters, and means for conditioning or acting upon the output pulses so that the output pulses indicate which counter has the greatest count therein.

Referring to FIG. 1, a pair of counters N1 and N2 are provided for counting the number of input pulses applied thereto and for providing an output pulse when filled. Preferably, the counters N1 and N2 are magnetic counters and are adjustable so that the number of pulses required to fill the counters may be varied, though it is to be understood that the invention is not limited to the use of magnetic counters but rather is intended to cover the use of any desired counters. Magnetic counters suitable for use in the present circuit are commercially available under the name "Incremag" and are described in detail in U.S. Patent 2,897,380, issued July 28, 1959 to C. Neitzert to which reference is made for the details of construction and operation.

Referring to FIG. 2, a counter constructed in accordance with the above-mentioned Neitzert patent is illustrated. Briefly stated, the counter has an input terminal 11, an output terminal 12 and a ground terminal 13. Power is supplied to the counter by a power supply designated as E. The heart of the counter is a saturable reactor 15 having a core 16, an input winding 17, an output winding 18, a triggering winding 19 and a reset winding 20. A transistor 21 having a base, an emitter and a collector, designated as *b, e* and *c*, has its input circuit connected across the triggering winding 19 and has its output circuit connected in series with the reset winding 20.

The material of the core 16 is so chosen that, when an input pulse is applied to the input winding 17, the magnetization of the core is advanced one step from negative saturation toward the condition of positive saturation. When a predetermined number of input pulses have been applied to the input winding, as determined by the volt-second content thereof, the saturation of the core is exceeded, i.e., the core is set, and, when the last pulse is removed, the sudden collapse of the excess flux induces a voltage in the triggering winding 19 which is in a direction to initiate conduction in the transistor 21. The resulting flow of current in the reset winding 20 induces a voltage in the triggering winding 19 whch causes still further current flow through the transistor output circuit to a point where a condition of negative saturation is achieved in the core of the reactor, i.e., the core is reset. When the core is driven from positive saturation to negative saturation, an output pulse is induced in the output winding 18 which is transmitted through a diode 23 to the output terminal 12 and, when the core has been driven back to the condition of negative saturation, the counter is conditioned to receive a new series of input pulses. The core may also be reset by applying a negative pulse to a reset input terminal 25 associated with the base of the transistor 21.

To prevent operation of the transistor 21 in response to small changes in flux which occur during each step of advancement toward saturation, a damping resistor 26 is connected in parallel with the reset winding 20. Moreover, to limit the base current of the transistor in face of a large voltage induced in the triggering winding, a series resistor 27 is used. Finally, there is provided in series with the collector of the transistor 21 a low value resistor 28 for the purpose of limiting the reset current, which not only tends to protect the transistor, but which also limits the load which is placed on the power supply E, and there is provided in series with the input winding 17 a resistor 29 for limiting the flow of input current.

It should be noted that any desired number of counters, such as the magnetic counter illustrated in FIG. 2, may be connected in tandem or cascaded so that a desired number of input pulses are required to be provided before an output pulse is provided by the tandem or cascaded arrangement, as disclosed in the above-mentioned Neitzert patent.

Input pulses are received at inputs P1 and P2 which are respectively associated with counters N1 and N2 and the input pulses are transmitted to the counters through gates OR 1 and OR 2 and through pulse formers PF1 and PF2. The pulse formers PF1 and PF2 are provided so that the input pulses applied to the counters N1 and N2 have constant volt-second contents regardless of the shape, duration or spacing of the input pulses provided at inputs P1 and P2.

The pulse formers PF1 and PF2 are also constructed in accordance with the teachings of the above-mentioned Neitzert patent and the circuits thereof correspond closely to the circuit of the counter illustrated in FIG. 2, the pulse formers PF1 and PF2 being so designed that in response to each input pulse applied thereto an output pulse is provided which has a predetermined constant volt-second content.

At the completion of a counting operation wherein input pulses are applied to the inputs P1 and P2, a train of pulses is simultaneously applied to the gates OR 1 and OR 2 which cause the counters N1 and N2 to be filled so that output pulses are provided thereby. If an output pulse is provided by one of the counters before the other counter, a series of pulses is provided in the output conductor 10 until an output pulse is provided by the other counter, the number of pulses in the series being equal to the differential count in the counters. Means are provided for causing the output pulses to be of a first polarity when the output pulse provided by the counter N1 precedes the output pulse provided by the counter N2 and of the opposite polarity when the output pulse of the counter N2 precedes the output pulse of the counter N1.

In the illustrated embodiment, a free-running oscillator 30 is provided for applying the train of pulses to the gates OR 1 and OR 2 and for providing a series of output pulses in the output conductor 10. The output of the oscillator 30 is connected to the input terminal of a gate AND 1 which has its output terminal connected to inputs of the gates OR 1 and OR 2 and to the input of a gate AND 2. The output of the gate AND 2 is in turn connected to the output conductor 10 through a pair of amplifiers AMP1 and AMP2, which are connected in parallel and through a gate OR 4. A readout pulser 31 is provided for causing a control pulse to be applied to the control input terminal of the gate AND 1 so that the gate AND 1 is opened or rendered conductive and pulses provided by the oscillator 30 are permitted to pass therethrough and through the gates OR 1 and OR 2 to the pulse formers PF1 and PF2 which apply corresponding pulses to the counters N1 and N2 that cause the counters to be filled. When the readout pulser 31 is operated, an output pulse is provided to the S input terminal of a flip-flop FF1 causing the flip-flop FF1 to be set. The S output terminal of the flip-flop FF1 is connected to the control input terminal of the gate AND 1 and, when the flip-flop FF1 is set, a pulse is transmitted to the control input terminal of the gate AND 1 causing the gate AND 1 to be opened or rendered conductive.

The outputs of the counters N1 and N2 are both connected to a gate OR 5 and are respectively connected to the S and R input terminals of a flip-flop FF2. When an output pulse is provided by one of the counters N1 or N2, the output pulse is applied to one of the input terminals of the flip-flop FF2 causing the flip-flop to be set or reset and the output pulse is transmitted through the gate OR 5 to the input terminal of a flip-flop FF3. In response o the counter output pulse, the flip-flop FF3 is set and an output is provided at the S output terminal thereof which is transmitted to the control input terminal of the gate AND 2 causing the gate AND 2 to be opened or rendered conductive so that subsequently the pulses from the oscillator 30 transmitted through the gate AND 1 are transmitted through the gate AND 2 to the inputs of the amplifiers AMP1 and AMP2.

The S output terminal of the flip-flop FF2 is connected to a bias input terminal of the amplifier AMP1 so that, when the flip-flop FF2 is set, the amplifier AMP1 is biased to provide a positive output pulse in response to the application of an input pulse to the input thereof. The R output terminal of the flip-flop FF2 is connected to a bias input terminal of the amplifier AMP2 so that, when the flip-flop FF2 is reset, the amplified AMP2 is biased to provide a negative output pulse in response to the application of an input pulse to the input thereof. The outputs of the amplifiers AMP1 and AMP2 are connected to inputs of the gate OR 4 so that the pulses provided by the amplifiers are transmitted therethrough to the output conductor 10. Thus, in response to an output pulse provided by one of the counters N1 or N2, one of the amplifiers AMP1 and AMP2 is conditioned for providing output pulses and pulses are transmitted from the oscillator 30 through the gates AND 1 and AND 2 to the inputs of the amplifiers so that output pulses are provided by the conditioned amplifier which are transmitted through the gate OR 4 to the output conductor 10.

Subsequently, when an output pulse is provided by the other counter, the output pulse is transmitted through the gate OR 5 to the input terminal of the flip-flop FF3 causing the flip-flop FF3 to be reset so that the gate AND 2 is closed or rendered nonconductive and the passage of pulses therethrough to the amplifiers AMP1 and AMP2 ceases. The R output terminal of the flip-flop FF3 is connected to the S input terminal of the flip-flop FF4 so that when the flip-flop FF3 is reset, the flip-flop FF4 is set. The S output terminal of the flip-flop FF4 is connected to the R input terminal of the flip-flop FF1, to the R input terminal of the flip-flop FF4 and to the reset input terminals of the counters N1 and N2 so that, when the flip-flop FF4 is set, the flip-flops FF1 and FF4 and the counters N1 and N2 are reset. When the flip-flop FF1 is reset, the gate AND 1 is closed or rendered nonconductive so that the passage of pulses from the oscillator therethrough to the gates OR 1 and OR 2 ceases. Thus, it may be seen that a series of pulses is applied to the amplifier inputs which causes a series of output pulses to be provided in the output conductor 10 during the time period between the production of output pulses by the counters N1 and N2, the number of pulses in the series corresponding to the differential count in the counters.

It should be noted that the S output terminal of the flip-flop FF4 may be disconnected from the reset input terminals of the counters N1 and N2 so that the counters N1 and N2 are not reset to initial conditions when the flip-flop FF4 is set. Thus, a running differential count may be maintained in the counters N1 and N2 and, at the completion of each counting operation, a differential output may be provided without destroying the differential count in the counters N1 and N2. Such is the case since the above-described magnetic counter, illustrated in FIG. 2, automatically resets itself when filled. Thus, in the illustrated embodiment of the invention, when one of the counters N1 and N2 is filled first, the filled counter resets itself and counts the subsequent pulses provided by the oscillator 30 until the other counter is filled. The count in one counter is then zero and the count in the other counter is equal to the differential count in the counters when the readout pulser 31 was rendered operative.

In operation, let it be assumed that input pulses have been applied to the inputs P1 and P2 which have caused the count in the counter N1 to be greater than the count in the counter N2. Subsequently when the readout pulser 31 is operated, an output pulse is provided thereby which is transmitted through the gate OR 3 to the S input terminal of the flip-flop FF1 causing the flip-flop FF1 to be set. When the flip-flop FF1 is set, the gate AND 1 is opened or rendered conductive so that pulses provided by the osciallator 30 are permitted to pass therethrough, through the gates OR 1 and OR 2 to the pulse formers PF1 and PF2 which apply corresponding pulses to the counters N1 and N2 that cause the counters to be filled. Since at the completion of the counting operation the count in the counter N1 was greater than the count in the counter N2, an output pulse will be provided by the counter N1 before an output pulse is provided by the counter N2.

The output pulse provided by the counter N1 is applied to the S input terminal of the flip-flop FF2 causing the flip-flop FF2 to be set so that the amplifier AMP1 is biased to provide positive output pulses in response to the application of pulses to the input thereof. The output pulse of the counter N1 is also transmitted through the gate OR 5 to the input terminal of the flip-flop FF3 causing the flip-flop FF3 to be set. When the flip-flop FF3 is set, the gate AND 2 is opened or rendered conductive so that the pulses from the oscillator 30 passing through the gate AND 1 are permitted to pass through the gate AND 2 to the input terminals of the amplifiers AMP1 and AMP2. Since the amplifier AMP1 has been conditioned for operation by the operation of the flip-flop FF2, a positive output pulse is provided thereby for each input pulse applied to the input thereof, the output pulses provided by the amplifier AMP1 being transmitted through the gate OR 4 to the output conductor 10.

Subsequently, when an output pulse is provided by the counter N2, the output pulse is transmitted through the gate OR 5 to the input terminal of the flip-flop FF3 causing the flip-flop FF3 to be reset. When the flip-flop FF3 is reset, the gate AND 2 is closed or rendered nonconductive so that the further passage of pulses therethrough is inhibited and the flip-flop FF4 is set. When the flip-flop FF4 is set, the flip-flops FF1 and FF4 and the counters N1 and N2 are reset. When the flip-flops FF1 is reset, the gate AND 1 is closed or rendered nonconductive so that the further passage of pulses therethrough is inhibited.

Thus, a series of pulses is transmitted through the gates AND 1 and AND 2 to the inputs of the amplifiers AMP1 and AMP2 during the time period between the providing of output pulses by the counters N1 and N2 and the number of pulses in the series is equal to the differential count in the counters N1 and N2. In the above-described example, since the amplifier AMP1 was conditioned for providing positive output pulses, a series of positive output pulses is provided thereby which is transmitted through the gate OR 4 to the output conductor 10 wherein the number of pulses in the series is equal to the number of pulses applied to the amplifier input, the number of input pulses being equal to the differential count in the counters N1 and N2. Therefore, a series of positive pulses equal in number to the differential count in the counters N1 and N2 is provided in the output conductor 10.

If a greater count had been provided in the counter N2 than in the counter N1, the amplifier AMP2 would have been conditioned for providing negative pulses and a series of negative pulses equal in number to the differential count in the counters N1 and N2 would have been provided in the output conductor 10.

In the illustrated embodiment of the invention, a control device 40 is connected to the output conductor 10 for responding to the pulses provided in the output conductor. The control device 40 may be any type of control device for controlling a desired external operation or, for example, may be a display unit for providing a visual indication of the differential count. Is should be noted that many different devices may be connected to the output conductor 10 which are capable of responding to the pulses provided therein and the invention is intended to cover all such devices.

Thus, it may be seen that an algebraic computational subtraction device has been provided for providing a series of pulses equal in number to the differential count in a pair of counters wherein the polarity of the output pulses is indicative of which counter has the greatest count therein. In the illustrated example, positive output pulses indicating that the count in the counter N1 is greater than the count in the counter N2 and negative output pulses indicating that the count in the counter N2 is greater than the count in the counter N1, though the invention is not intended to be limited to this arrangement.

I claim as my invention:

1. In an algebraic computational subtraction device for controlling a desired operation in accordance with the difference between the number of pulses provided by two sources, the combination which comprises first and second counters for independently counting pulses provided by the two sources, means associated with the counters for providing a series of output pulses when rendered operable wherein the number of pulses is equal to the differential count in the counters, the pulses being of a first polarity when the count in the first counter is greater and being of the opposite polarity when the count in the second counter is greater, means for rendering the output pulse providing means operable upon termination of the providing of pulses by the sources, and means responsive to the output pulses for controlling the desired operation.

2. In an algebraic computational subtraction device for providing an output indicative of the difference between the number of pulses provided by two sources, the combination which comprises first and second counters for independently counting pulses provided by the two sources, means associated with the counters for providing a series of output pulses when rendered operable wherein the number of pulses is equal to the differential count in the counters, means for acting upon the output pulse providing means so that the output pulses indicate which counter has the greatest count therein, and means for rendering the output pulse providing means operable upon termination of the providing of pulses by the sources.

3. In an algebraic computational subtraction device for providing an output indicative of the difference between the number of pulses provided by two sources, the combination which comprises first and second adjustable counters for independently counting pulses provided by the two sources, means associated with the counter for providing a series of output pulses when rendered operable wherein the number of pulses is equal to the differential count in the counters, means for acting upon the output pulse providing means so that the output pulses indicate which counter has the greatest count therein, and means for rendering the output pulse providing means operable upon termination of the providing of pulses by the sources.

4. In an algebraic computational subtraction device for providing an output indicative of the difference between the number of pulses provided by two sources, the combination which comprises first and second counters for independently counting pulses provided by the two sources, an output circuit, means associated with the counters and the output circuit for providing a series of output pulses in the output circuit when rendered operable wherein the number of pulses is equal to the differential count in the counters, means associated with the output circuit and responsive to a greater count in the first counter for causing the output pulses to be of a first polarity and responsive to a greater count in the second counter for causing the output pulses to be of the opposite polarity, and means for rendering the output providing means operable upon termination of the providing of pulses by the sources.

5. In an algebraic computational subtraction device for providing an output indicative of the difference between the number of pulses provided by two sources, the combination which comprises first and second counters having inputs and outputs for independently counting pulses provided by the two sources and for providing output pulses when filled, an auxiliary source of pulses, readout means for associating the auxiliary source with the first and second counter inputs when rendered operable so that a train of pulses is simultaneously applied thereto and the counters are filled, an output circuit, means responsive to the output of one counter only for associating the auxiliary source with the output circuit and responsive to the subsequent output of the other counter for disassociating the auxiliary source from the output circuit so that a series of pulses equal to the differential count in the counters is provided in the output circuit, means associated with the output circuit and responsive to the counter outputs for causing the pulses provided in the output circuit to be of a first polarity when the output of the first counter precedes the output of the second counter and to be of the opposite polarity when the output of the second counter precedes the output of the first counter, and means for rendering the readout means operable.

6. In an algebraic computational subtraction device for providing an output indicative of the difference between the number of pulses provided by two sources, the combination which comprises first and second magnetic counters having inputs and outputs for independently counting pulses provided by the two sources and for providing output pulses when filled, an auxiliary source of pulses, readout means for associating the auxiliary source with the first and second counter inputs when rendered operable so that a train of pulses is simultaneously applied thereto and the counters are filled, each counter resetting itself to an initial condition when filled, an output circuit, means responsive to the output of one counter only for associating the auxiliary source with the output circuit and responsive to the subsequent output of the other counter for disassociating the auxiliary source from the output circuit so that a series of pulses equal to the differential count in the counters is provided in the output circuit, means associated with the output circuit and responsive to the counter outputs for causing the pulses provided in the output circuit to be of a first polarity when the output of the first counter precedes the output of the second counter and to be of the opposite polarity when the output of the second counter precedes the output of the first counter, and means for rendering the readout means operable, the differential count in the counters being restored at the completion of a readout operation.

7. In an algebraic computational subtraction device for providing an output indicative of the difference between the number of pulses provided by two sources, the combination which comprises first and second counters having inputs and outputs for independently counting pulses provided by the two sources and for providing output pulses when filled, an auxiliary source of pulses, readout means for associating the auxiliary source with the first and second counter inputs when rendered operable so that a train of pulses is simultaneously applied thereto and the counters are filled, first and second amplifier circuits having inputs and outputs for amplifying signals applied to the inputs when rendered effective, one amplifier being designed to provide an output of a first polarity and the other amplifier being designed to provide an output of the opposite polarity, an output circuit associated with the amplifier circuit outputs, means responsive to an output of one counter for associating the auxiliary source with the amplifier circuit inputs and responsive to an output of the other counter for disassociating the auxiliary source from the amplifier circuit inputs so that a series of pulses equal to the differential count in the counters is applied thereto, means associated with the amplifier circuits and responsive to the counter outputs for rendering the first amplifier circuit effective when the output of the first counter precedes the output of the second counter and for rendering the second amplifier circuit effective when the output of the second counter precedes the output of the first counter, and means for rendering the readout means operable.

8. In an algebraic computational subtraction device for providing an output indicative of the difference between the number of pulses provided by two sources, the combination which comprises first and second counters having inputs and outputs for independently counting pulses provided by the two sources and for providing output pulses when filled, an auxiliary source of pulses, readout means for associating the auxiliary source with the first and second counter inputs when rendered operable so that a train of pulses is simultaneously applied thereto, first and second amplified circuits having inputs and outputs for amplifying signals applied to the inputs when rendered effective, the first amplifier circuit being designated to provide an output having a first polarity and the second amplifier circuit being designed to provide an output having the opposite polarity, means responsive to an output of the first counter only for associating the auxiliary source with the input to the first amplifier circuit and for rendering the first amplifier circuit effective and subsequently responsive to an output of the second counter for disassociating the auxiliary source from the first amplifier circuit input so that a series of pulses equal to the differential count in the counters is provided in the output circuit indicating a greater count in the first counter than in the second counter, means responsive to an output of the second counter only by associating the auxiliary source with the second amplifier circuit input and for rendering the second amplifier circuit effective and subsequently responsive to an output of the first counter for disassociating the auxiliary source from the second amplifier circuit so that a series of pulses equal to the differential count in the counters is provided in the output circuit indicating a greater count in the second counter than in the first counter, and means for rendering the readout means operable.

9. In an algebraic computational subtraction device for providing an output indicative of the difference between the number of pulses provided by two sources, the combination which comprises first and second magnetic counters having inputs and outputs for independently counting pulses provided by the two sources and for providing output pulses when filled, an auxiliary source of pulses, readout means for associating the auxiliary source with the first and second counter inputs when rendered operable so that a train of pulses is simultaneously applied thereto, first and second amplifier circuits having inputs and outputs for amplifying signals applied to the inputs when rendered effective, the first amplifier circuit being designed to provide an output having a first polarity and the second amplifier circuit being designed to provide an output having the opposite polarity, means responsive to an output of the first counter only for associating the auxiliary source with the input to the first amplifier circuit and for rendering the first amplifier circuit effective and subsequently responsive to an output of the second counter for disassociating the auxiliary source from the first amplifier circuit input so that a series of pulses equal to the differential count in the counters is provided in the output circuit indicating a greater count in the first counter than in the second counter, means responsive to an output of the second counter only by associating the auxiliary source with the second amplifier circuit input and for rendering the second amplifier circuit effective and subsequently responsive to an output of the first counter for disassociating the auxiliary source from the second amplifier circuit so that a series of pulses equal to the differential count in the counters is provided in the output circuit indicating a greater count in the second counter than in the first counter, and means for rendering the readout means operable.

No references cited.

MALCOLM A. MORRISON, *Primary Examiner.*

I. FAIBISCH, *Assistant Examiner.*